Patented Feb. 1, 1927.

1,616,166

UNITED STATES PATENT OFFICE.

WILLIAM C. ARSEM, OF SCHENECTADY, NEW YORK, ASSIGNOR TO INDUSTRIAL TECHNICS CORPORATION, OF SCHENECTADY, NEW YORK, A CORPORATION OF NEW YORK.

PRODUCTION OF LEVULOSE.

No Drawing. Application filed March 29, 1920. Serial No. 369,537.

This invention relates to the production of levulose from inulin-bearing parts of plants and more particularly to the production of levulose from the bulbs of the dahlia plant.

In my application, Serial No. 347,797, filed December 27, 1919, I have described a method for producing levulose or fruit sugar from the above sources which method is characterized among other features by the steps which comprise first extracting the bulbs or other inulin-bearing parts of the plant with water and then removing certain organic and inorganic impurities from the inulin before hydrolyzing the same by means of dilute acid to produce fructose. The importance of first removing these impurities before attempting further treatment of the inulin to convert to fructose was fully emphasized in the aforesaid application and it was shown that the methods known prior to my aforesaid invention did not remove these impurities. Also, in the aforesaid application, I further showed how these impurities could be removed in part by treating the aqueous extract containing the inulin with magnesium hydroxide and in part by dehydrating the inulin while in solution or colloidal condition by means of alcohol so as to render the inulin insoluble and then washing the inulin with water to remove water-soluble impurities or with alcohol to remove alcohol-soluble impurities.

Prior to the invention of the processes of my application, Serial No. 347,797, and of the process of my present invention, the commonly used method of extracting the inulin from dahlia bulbs and the like consisted in the main in extracting the comminuted bulbs with relatively large proportions of water (sometimes containing calcium carbonate), filtering and subsequently freezing the extract so obtained to bring about the flocculation or precipitation of the inulin, then thawing and separating the precipitated inulin. But this process and all similar processes are entirely impracticable for commercial application, because a large proportion of the inulin remains in solution after freezing and thawing the aqueous extract, and further because of the fact discovered by me that certain impurities which seriously interfere with the hydrolysis of inulin to fructose are not removed from the separated inulin by these older methods. The presence of these impurities in the separated inulin brings about a decomposition of the inulin into products other than fructose during the course of the hydrolytic treatment, owing to the influence of these impurities upon the acidity of the solution and upon the general course of the hydrolytic resolution of the inulin. Also, the solution becomes discolored because of these undesirable decomposition products, and furthermore it is very difficult to separate fructose from such impure solutions by crystallization from water, or to obtain a pure product by evaporation to dryness such as I may do in my present improved processes.

I have now discovered new and improved means of separating highly purified inulin from plant juices without employing alcohol for this purpose, whereby the entire process of producing fructose from plants is greatly simplified and the cost of manufacture greatly reduced.

The process of the present invention depends upon a yet more complete removal of certain impurities in the plant juice which tend to hold the inulin up in solution in colloidal condition in the juice or extract, and upon improved means of coagulating the purified colloidal inulin which results from this first purification step.

Both these highly desirable results are attained in the process of the present invention in large part by adjusting the range of acidity or hydrogen-ion concentration of the extract to particularly favorable values during the clarification and also during the coagulation or precipitation of the purified inulin from colloidal solution.

I have found that inulin occurs in the sap of plants and particularly in the sap of dahlia bulbs largely in the form of a complex colloid in a colloidal solution of the type of a complex hydrosol.

In this colloidal solution the disperse phase consists of highly hydrated aggregates of inulin molecules combined with a varying number of molecules or aggregates of certain organic substances, such as albumins, pectins and the like, and also with molecules of inorganic substances, such as alkali, alkali-earth and earth compounds.

Furthermore, I have discovered the very important fact that the stability of this complex colloidal solution or raw juice containing the inulin and various impurities, depends in large part upon the exact range of concentration of hydrogen-ion or hydroxyl-ion in the plant juice. I have further found that the stability of this colloidal solution also depends upon the temperature and upon the amount of water present, i. e., upon the degree of dilution with water.

I have discovered further that some of the organic substances present in the juice function as protective colloids. By the term "protective colloids" I mean colloidal substances which aid in keeping the inulin in a stable condition in the aqueous liquid, so that it does not readily precipitate from solution on standing or cooling.

I am well aware that the term protective colloids as commonly used is applied to organic colloids usually of the reversible type which tend to stabilize inorganic hydrosols of the irreversible type, such as metal hydrosols and the like, but the protective action in the present case is of like character, since the addition of electrolytes has little coagulative action upon the inulin until after these protective colloids are removed. Moreover, purified inulin has characteristics as a colloid which relate it to the irreversible colloids, since upon evaporation at ordinary temperatures it tends to assume a more insoluble form which does not readily go back into either colloidal or true solution when water is added to it.

This protective action of the impurities upon the stability of the inulin whereby it is prevented from precipitating out of the liquid, is no doubt due in large part to a loose chemical combination between the colloidal inulin and certain of these colloidal impurities, due to the amphoteric character of the inulin which is weakly basic toward certain acids, and weakly acid toward certain bases, depending upon the relative strength and concentration of the acid or base with which it is treated. Hence, inulin tends to remain in solution in a liquid which is either too strongly acid or too strongly basic. And I have found that the limits as to acidity and basicity within which the inulin is separated from such stable combinations with colloidal impurities are extremely narrow and have a definite range which I have specified in terms of the hydrogen-ion concentration of the inulin-containing liquid, as hereinafter described.

Purified inulin or inulin hydrate upon dissolving in boiling water probably forms a true solution in which the inulin is "molecularly dispersed." Upon cooling, however, I have discovered that the inulin passes first into a highly hydrated form which then divides into two liquid phases corresponding to the condition of a viscous gelatine solution in which two liquid phases are present differing in the degree of hydration. Upon standing the less hydrated phase loses water progressively and finally separates as a non-colloidal hydrate of inulin having a relatively low molecular weight. This occurs without definite formation of a gel. I have found that anything which favors the removal of water from the less hydrated phase also favors the separation of insoluble inulin hydrate; thus, I have found that the separation of insoluble inulin from solution is hastened at this stage of my process by cooling, freezing or the addition of alcohol or of certain salts. Also, I have found that evaporation of a portion of the water from the liquid, preferably at low temperatures, also favors the removal of water from the less hydrated phase of the colloidal solution, and thereby promotes the separation of the insoluble inulin hydrates.

Furthermore, I have discovered the very important fact that the speed and completeness of the separation of inulin from the less hydrated phase in the purified colloidal solution is favored by a hydrogen ion concentration lying between about $10^{-5}$ and $10^{-9}$ normal, referred to the value $1 \times 10^{-14}$ as the dissociation constant of pure water.

I have also found that boiling the fibre with water as formerly practiced extracts an additional quantity of protective colloids and other impurities from the fibre which later interfere with the separation of the inulin and with its conversion to fructose. Therefore, to avoid this difficulty I prefer to extract the inulin without heating, or I may separate the juice from the comminuted dahlia bulbs or similar inulin-bearing parts of plants entirely by mechanical means.

As previously mentioned I may then accomplish the separation of the inulin from the raw juice by first adjusting the concentration of hydrogen-ion or hydroxyl-ion of the raw juice to a value varying between $10^{-5}$ normal of hydrogen-ion and a few hundredths normal of hydroxyl-ion by adding a calculated amount of base to the normally acid juice; then heating to coagulate the protective colloids and certain other impurities, then separating the precipitated impurities from the remaining liquid and finally allowing the liquid containing the inulin to stand preferably in a cool place until the inulin separates as inulin hydrate. Or, I may first heat the raw untreated juice to coagulate the protective colloids and certain other impurities, separate the liquid from the precipitate and then adjust the hydrogen-ion or hydroxyl-ion concentration as above described and heat again and filter before allowing the inulin hydrate to settle out of the solution. In this form the inulin can be readily separated from the aqueous liquid and washed free from water-soluble or alcohol-soluble impurities without serious loss and then treated further with dilute acid to convert to levulose of such a high degree of purity that it can be readily crystallized from aqueous solution.

. After removal of the precipitable impurities by any of the means previously described, instead of allowing the inulin hydrosol merely to stand in order to bring about its separation from the aqueous liquid I have found that the dehydration of the less hydrated phase of the hydrosol and the resulting separation and precipitation of the inulin is hastened and made more complete by first driving off the excess water by evaporation, preferably in vacuo, until the inulin in the hydrosol or colloidal solution reaches a concentration greater than about 10 per cent. Furthermore, I have found that freezing the entire colloidal solution after removal of the precipitable impurities, in accordance with my process as described, also aids in the separation of the inulin. But it is not necessary in my process to freeze the colloidal solution in order to separate the inulin so that in my process freezing may or may not be used according to whether the cost of freezing is greater or less than the gain resulting from the increased yield of inulin obtained thereby, or greater or less than the saving in time effected thereby. Moreover, in my process the effect of freezing upon the separation of the inulin is much more pronounced than in prior processes and the yield is also greater and the product purer.

Having described the more important features of my improved process, I shall now describe in greater detail the exact manner in which I prefer to carry out my process so that any one skilled in the art may be enabled to obtain the advantageous results which I obtain.

It will be understood, however, that my invention is not restricted to the exact details described below, but that the invention may be carried out in other ways.

Furthermore, it will be understood that although my invention applies more specifically to the extraction of pure inulin from inulin bearing parts of plants, it may also be applied to the extraction of colloidal carbohydrates other than inulin from plants containing carbohydrate compounds of the same general character.

In making fructose from dahlia bulbs, I proceed as follows:

I take 1,000 pounds of dahlia bulbs, wash thoroughly with water in a suitable apparatus to remove adhering dirt, and at the same time I may agitate the bulbs to dislodge by friction the loose outer layer of skin which comes off in small fragments, easily washed away. I now reduce the bulbs to pulp by grinding, pressing, rolling or otherwise, so as to release as much of the juice as possible and then separate the juice from the solid matter by a rough filtration. I may also extract the residual pulp more completely by soaking in water and pressing.

I now add to the juice a solution or suspension of a basic substance, such as sodium, potassium, calcium or ammonium hydroxide, or sodium, or potassium carbonate, magnesium hydroxide, aluminum hydroxide, sodium acetate, etc. Alternatively, I may add two or more substances which can react to produce a desired hydroxide; for example, solutions of magnesium sulfate and sodium hydroxide, which may be added separately to the juice or mixed before adding as the sodium sulfate formed by the reaction has no harmful influence on the process. The amount of basic substance so added is determined by the acidity or hydrogen-ion concentration of the juice, and enough must be added to cause complete removal of precipitable impurities when the solution is boiled. I titrate a measured quantity of the juice with standard sodium hydroxide until it turns methyl red paper yellow, and thus determine its acid normality. In fresh dahlia juice this value is generally from 0.02 to 0.04 normal, and in practice I find it best to add somewhere between 50 per cent and 100 per cent of the equivalent amount of basic substance above specified to the main portion of the juice, leaving the hydrogen-ion concentration somewhat greater than that corresponding to the true neutral point which corresponds to $10^{-7.07}$ normal acidity or alkalinity. While I prefer to establish this range of acidity because of the subsequent greater ease of filtration and higher yield of inulin, I may even add enough basic substance to make the juice quite alkaline to phenol-phthalein and will still have a satisfactory result. At such a hydrogen-ion concentration the extract contains less than about 0.00001 gram equivalents of acid per liter and not more than about 0.00001 gram equivalents of dissolved base per liter or insufficient acid to turn methyl orange paper from yellow to pink and not appreciably more than enough base to turn phenol-phthalein paper from colorless to pink.

I now boil the juice one or two hours without allowing it to become more concentrated. The boiling may, for example, take place under a reflux condenser or other means may be used to prevent substantial escape of water with a resulting increase of concentration. Considerable material is thereby precipitated in flocculated condition, consisting of vegatable albumens or similar substances, mixed with alkaline earth phosphates and other inorganic or mixed compounds. Instead of cold-pressing the pulp and treating the strained juice as above described, I may treat the finely divided pulp still admixed with the juice, by adding the basic substance, boiling one or two hours and then filtering. I then remove the solid matter by filtration and concentrate the clarified juice by evaporation until the inulin content is 10 to 30 per cent, or even higher, although inulin begins to separate as a solid hydrate somewhere in this range of concentration. I may even evaporate the solution approximately to dryness, using a vacuum drum dryer or other suitable apparatus.

I then allow the mixture to cool and keep it cold, preferably agitating it meanwhile for a number of hours or until the inulin has separated as completely as possible as a hydrate or mixture of hydrates of the form $C_6H_{10}O_5 \cdot nH_2O$ in which n is a small number probably less than 10. This hydrated form is practically insoluble in cold water, so I now add water, preferably ice cold, to dilute the mixture and make it more fluid, and then filter off the inulin and wash it thoroughly. The inulin is thus freed from soluble impurities which pass off in the wash water, and is very pure, containing usually less than 0.05 per cent of inorganic matter or ash, as determined by combustion. If desirable the inulin can be purified still further by dissolving in hot water, treating with bone-black or the basic substances above mentioned, etc., finally evaporating to 10 per cent or higher concentration, allowing to stand, adding water and filtering off and washing as above described. During this last soaking and washing operation, I may add a small quantity of weak acid such as acetic acid. The purified inulin finally obtained in the form of a damp mass may be dried by gentle heat, or it may be used directly for the manufacture of fructose.

In the latter case, I dissolve it in hot water, filter if necessary, add hydrochloric acid until the solution is .01 normal or less, choosing the amount which gives a maximum yield of fructose and a minimum of its decomposition products, and then heat for a period of one-half hour to one and one-half hours at the boiling point. The free acid is now neutralized with a slight excess of sodium carbonate or bicarbonate, and then enough acetic acid is added to combine with the excess of alkali and leave the solution slightly acid.

I then evaporate the solution preferably in vacuo until its concentration is about 85 per cent fructose, allow it to cool considerably, add some fructose crystals to start crystallization, then continue heating at a low temperature under vacuum with constant agitation until the whole solution becomes a solid mass of dry crystals of fructose. The actual process of crystallizing need not be carried out exactly as described above; for example, I may add crystals of fructose to the cold 85 per cent syrup and either agitate the mixture or allow it to stand until crystallization has gone as far as it will; then I may allow the crystallization to complete itself by evaporating the water from the mixture in a vacuum shelf dryer, and then disintegrate the mass of crystals by grinding. Instead of crystallizing the fructose from its aqueous solution as above described, I may evaporate the solution directly to dryness to obtain a marketable product, or I may crystallize the fructose by the use of alcohol as described in my application, Serial No. 347,797. I may if desired wash the solid fructose obtained by any of the above methods with very strong alcohol.

In place of the clarification step described above I may add to the dahlia juice sodium phosphate solution until the methyl red end point is passed and heat to boiling. This precipitates chiefly the albuminous substances and perhaps some insoluble phosphates. Then add an equivalent amount of magnesium sulphate solution and continue the boiling somewhat longer. This brings down a further precipitate containing magnesium phosphate with some organic matter which is not brought down by sodium phosphate, and leaves the solution in a condition so that it can be filtered rapidly, giving a clear filtrate. The modus operandi of this procedure is probably to automatically maintain a certain definite hydrogen-ion concentration regardless of the chemical changes which take place so that the maximum amount of insoluble matter and colloidal material is precipitated.

The inulin obtained from this filtrate, after concentration, standing and washing, is very white and of good appearance.

The use of sodium phosphate instead of sodium hydroxide has the advantage that no alkaline hydroxide or magnesium hydroxide is present in the solution at any time and the formation of insoluble inulin salts of magnesium is avoided, thus bringing about a higher recovery of inulin from the bulbs.

I claim:

1. The process of purifying inulin which comprises adding a basic substance to an acid aqueous extract containing the inulin until the said extract contains less than about 0.00001 gram equivalents of acid per liter, and not more than about 0.00001 gram equivalents of dissolved base per liter, then heating the thus neutralized aqueous extract to precipitate insoluble impurities and separating the precipitate from the liquid.

2. The process of purifying inulin which comprises adding a basic substance to an acid aqueous extract containing the inulin until the said extract contains insufficient acid to turn methyl orange paper from yellow to pink and not appreciably more than enough base to turn phenol-phthalein paper from colorless to pink, then heating the extract and separating the precipitate thus formed from the liquid.

3. The process of purifying inulin which comprises adding a basic substance to an acid aqueous extract containing the inulin until the concentration of hydrogen-ion in the said extract is less than about $10^{-5}$ normal, but not less than about $10^{-9}$ normal, and then heating to precipitate insoluble impurities and separating the precipitate from the liquid.

4. The process of extracting inulin from plants which comprises separating the juice from the fibre by mechanical means, then adding a basic substance to the juice so obtained until the said juice contains less than about 0.00001 gram equivalents of acid per liter, and not more than about 0.00001 gram equivalents of dissolved base per liter, heating the juice to precipitate insoluble impurities and then separating the precipitate from the liquid.

5. The process of separating inulin from an aqueous liquid containing the same which comprises heating the solution to coagulate protective colloids, reducing the hydrogen-ion concentration of the liquid to a value lying between about $10^{-5}$ normal and $10^{-9}$ normal, then allowing the liquid to stand until the inulin is precipitated from the liquid and separating the precipitated inulin from the liquid.

6. The process of separating inulin from an aqueous liquid containing the same which comprises heating the solution to coagulate protective colloids, concentrating until the concentration of inulin exceeds 10%, reducing the hydrogen-ion concentration of the liquid to a value lying between about $10^{-5}$ normal and $10^{-9}$ normal, then allowing the liquid to stand until the inulin is precipitated from the liquid and separating the precipitated inulin from the liquid.

7. The process of extracting inulin from plants which comprises separating the juice from the fibre by mechanical means, adding a basic substance to the juice, heating the said juice until insoluble impurities are precipitated therefrom, separating the precipitated impurities from the juice, evaporating a portion of the water from the juice, allowing the inulin to precipitate from the liquid and then separating the precipitated inulin from the liquid.

8. The process of extracting inulin from plants which comprises separating the juice from the plant by mechanical means, adjusting the concentration of hydrogen-ion in the juice to a value not greater than about $10^{-5}$ normal and not less than about $10^{-9}$ normal, heating the said juice until insoluble impurities are precipitated therefrom, separating the precipitated impurities from the juice, freezing the juice, thawing the frozen juice, then allowing the inulin to precipitate from the juice and then separating the precipitated inulin from the liquid.

9. The process of extracting inulin from plants which comprises separating the juice from the plant by mechanical means, adding a basic substance to the juice, heating the said juice until insoluble impurities are precipitated therefrom and separating the precipitated impurities from the juice.

10. The process of extracting inulin from plants which comprises separating the juice from the plant by mechanical means, adding a basic substance to the juice, heating the said juice until insoluble impurities are precipitated therefrom and separating the precipitated impurities from the juice, evaporating a portion of the water from the juice, freezing the concentrated juice thus obtained, thawing the frozen juice, allowing the inulin to precipitate from the liquid and separating the precipitated inulin from the liquid.

11. The method of separating inulin in a purified state from aqueous liquid containing inulin which comprises adjusting concentration of hydrogen-ion in the aqueous liquid to a value less than about $10^{-5}$ normal but not less than about $10^{-9}$ normal to precipitate impurities from the liquid and separating the impurities from the inulin, substantially as described.

In testimony whereof I affix my signature.

WILLIAM C. ARSEM.